United States Patent Office 3,327,834
Patented June 27, 1967

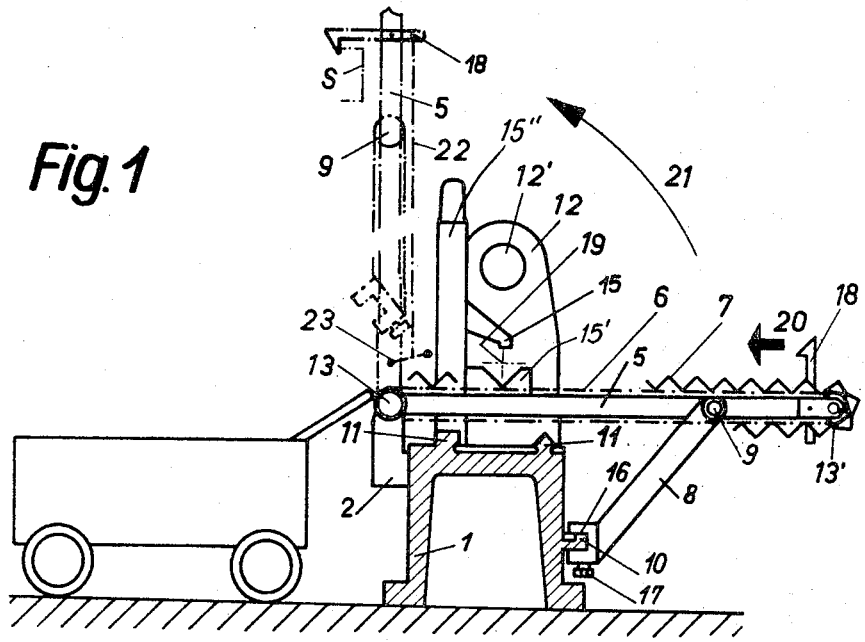
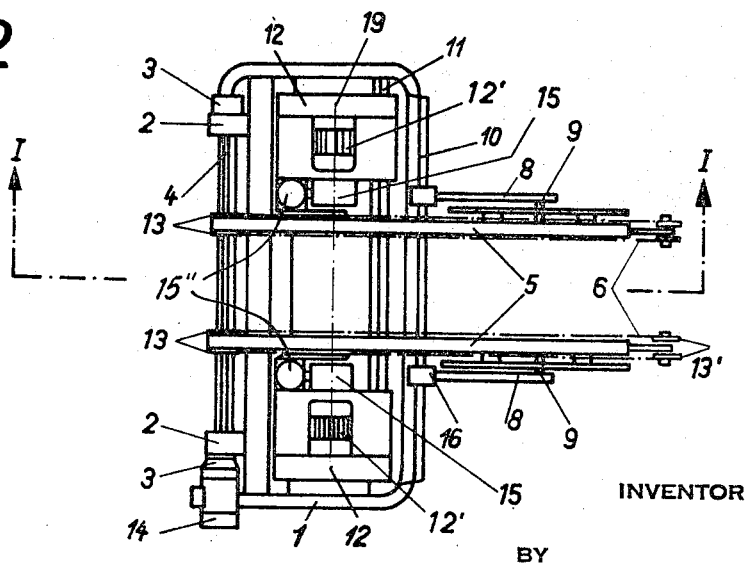

3,327,834
CONVEYING DEVICE FOR MACHINE TOOLS FOR LOADING AND UNLOADING WORK PIECES
Hans-Werner Steinmetz, Schaffhausen, Switzerland, assignor to Georg Fischer Aktiengesellschaft, Schaffhausen, Switzerland
Filed Oct. 18, 1965, Ser. No. 497,387
Claims priority, application Switzerland, Oct. 23, 1964, 13,754/64
5 Claims. (Cl. 198—19)

The present invention relates to a conveying device for machine tools for loading and unloading workpieces, especially for the automatic feeding of workpieces to be machined, for instance shafts and the like to be cut to length and to be centered.

It is known to effect the loading and unloading of workpieces for machine tools by chain conveyor means. It is further known to equip such chain conveyor means with prismatic supports by employing angularly shaped profiles so that the longitudinal axis of the workpiece to be conveyed to the machine tool will remain perpendicular to the transporting direction, while the height of the prismatic support is varied in such a way that the axes of the workpieces in spite of different diameters will be located at the same height or level as the spindle axis of the machine tool.

Chain conveyor means for machine tools are advantageous, in particular when a plurality of identical workpieces is to be machined. When on one and the same machine tool such a small number of workpieces is to be machined that the adjustment of the chain conveyor means does not pay, the non-automatic manual operation of the machine is impeded by the built-on conveyor means.

It is, therefore, an object of the present invention to provide a conveying device for machine tools for loading and unloading of workpieces which will overcome the above-mentioned drawback.

It is another object of this invention to provide a conveying device which will make it possible without difficulties to load one and the same machine tool, for instance a cutting-to-length and centering machine, selectively automatically or manually.

These and other objects and advantages of the invention will appear more clearly from the following specification in connection with the accompanying drawing, in which:

FIG. 1 is a diagrammatic cross section through a machine tool and through a loading and unloading device according to the present invention, said loading and unloading device being adapted to be pivoted toward the machine tool.

FIG. 2 is a top view of the arrangement shown in FIG. 1.

In order to be able to load one and the same machine tool selectively automatically by a conveying device or to load the machine tool manually with individual workpieces, the present invention provides a conveying device which comprises at least one beam carrying at least one endless conveyor and being adapted independently to be pivoted and axially displaced along a shaft which is located laterally above the bed of the machine at such a level that the conveying device will, when pivoted out of its working position, be located outside the working range of the machine tool. Advantageously, the shaft about which the conveying device is pivotable and axially displaceable serves simultaneously as drive shaft for the conveying means on said beam.

Referring now to the drawing in detail, the machine bed 1 is provided with two arms 2 equipped with bearings 3 having rotatably journalled therein a drive shaft 4 which may for instance be a hexagonal shaft. Two longitudinal supports or arms 5 are manually displaceable on drive shaft 4 in axial direction of the latter prior to the start of the operation and in conformity with the length of the workpieces to be transported and thereafter to be machined. Said supports or arms 5 are pivotable about said shaft 4 in upward direction and have their ends equipped with pairs of sprockets 13 and 13'. Conveyor chains 6 passing over sprockets 13, 13' are provided with prismatic supports 7 (only partially shown in FIG. 1) on which the workpieces to be machined rest and are conveyed in the direction of the arrow 20 toward the machining axis 19. Shaft 4 is adapted to be driven by a transmission motor 14 which is advantageously equipped with an electromagnetic braking device inasmuch as the feeding movements of the chain are effected stepwise. Supporting arms 5 with pivots 9 and pivotable supports 8 and clamping jaws 16 connected thereto may in any desired position of the adjusting range of arms 5 on shaft 4 be screwed tight on a supporting rail 10 mounted on machine bed 1. Clamping jaws 16 are provided with clamping screws 17 by means of which the supports 8 can be clamped fast to supporting rail 10. Supporting arms 5 can have furthermore connected thereto arresting or locking devices 18 by means of which the arms 5 in pivoted condition, as indicated by arrow 21, may be locked to a U-shaped support S indicated in dot-dash lines in FIG. 1. For unlocking the devices 18, rods 22 and handles 23 (FIG. 1) are provided.

Machine bed 1 of the machine tool shown in the drawing has two sliding paths or tracks 11 on which two tail spindle units 12 together with one drive motor 12' each and a machining tool both for cutting to length and for centering (not illustrated) may be displaced in conformity with the length of the workpiece to be machined and may be clamped fast in working position. The tail spindle units 12 have hydraulically or mechanically operable devices 15" for simultaneously moving upper and lower clamping means 15 and 15' in vertical direction and opposite to each other. In clamped position, the workpiece is lifted off slightly from the conveyor chains 6 by the lower clamping means 15' and then clamped by the upper clamping means 15 to be held in a suitable position on machining axis 19 with regard to the machining tool.

In view of the axial displaceability of the two arms 5 mounted on the hexagonal shaft 4 and the sprocket wheels 13, it is possible to feed and machine workpieces of different lengths in a simple manner.

If, however, it is required by means of the machine tool to machine workpieces which due to their dimensions or shape cannot be received by the loading and unloading device, the device can without great effort be pivoted in the direction of the arrow 21 about shaft 4 out of the working range of the machine tool and can be arrested in a desired position as illustrated in dot-dash lines in FIG. 1.

It is, of course, to be understood that the present invention is, by no means, limited to the particular construction shown in the drawing but also comprises any modification within the scope of the appended claims.

What I claim is:
1. In combination with a machine tool having a bed and workpiece holding means movably mounted on said bed: shaft means supported by said bed and arranged along one side thereof while being located at a level higher than the top surface of said bed, arm means pivotally supported by and displaceable on said shaft means in axial direction thereof, said arm means extending from said one side of said bed transverse to said bed beyond the other side thereof, and endless conveyor means supported by and extending along said arm means, said arm means together with said conveyor means being movable on said shaft means out of the working range of said workpiece holding means in a plane substantially perpendicular to the axis of said shaft means.

2. An arrangement according to claim 1, in which said arm means is pivotable into a substantially vertical position, and means for holding said arm means in said vertical position.

3. An arrangement according to claim 1, which includes means for automatically engaging and holding said arm means in its out of working range position.

4. In combination with a machine tool having a bed and workpiece holding means movably mounted on said bed: shaft means supported by said bed and arranged along one side thereof while being located at a level higher than the top surface of said bed, arm means pivotally supported by and displaceable on said shaft means, in axial direction thereof, said arm means extending from said one side of said bed transverse to said bed beyond the other side thereof, endless conveyor means supported by and extending along said arm means, said arm means together with said conveyor means being movable on said shaft means out of the working range of said workpiece holding means in a plane substantially perpendicular to the longitudinal axis of said shaft means, motor means drivingly connected to said shaft means, and means drivingly connecting said shaft means to said conveyor means for driving the same.

5. In combination with a machine tool having a bed and workpiece holding means movably mounted on said bed for holding a workpiece to be machined: shaft means supported by said bed and arranged along one side thereof while being located at a level higher than the top surface of said bed, arm means pivotally supported by and displaceable on said shaft means in axial direction thereof, said arm means extending from said one side of said bed transverse to said bed beyond the other side thereof, supporting means arranged on and along said other side of said bed, link means having one end pivotally connected to said arm means and having its other end detachably connected to said supporting means, and endless conveyor means supported by and extending along said arm means, said arm means together with said conveyor means being movable on said shaft means out of the working range of said machining means in a plane substantially perpendicular to the longitudinal axis of said shaft means.

References Cited

UNITED STATES PATENTS 2,059,710   11/1936   Rupple _____ 82—2.7 X

EVON C. BLUNK, *Primary Examiner.*

EDWARD A. SROKA, *Examiner.*